April 11, 1933.  N. L. SNOW ET AL  1,903,650
BLOWER FOR AIR HEATERS
Filed July 19, 1928   8 Sheets-Sheet 4
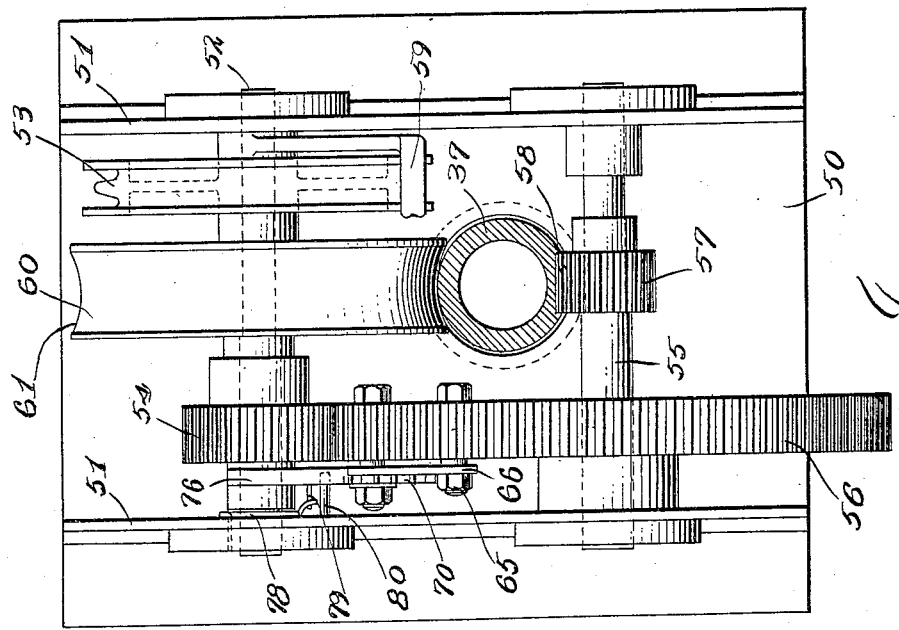
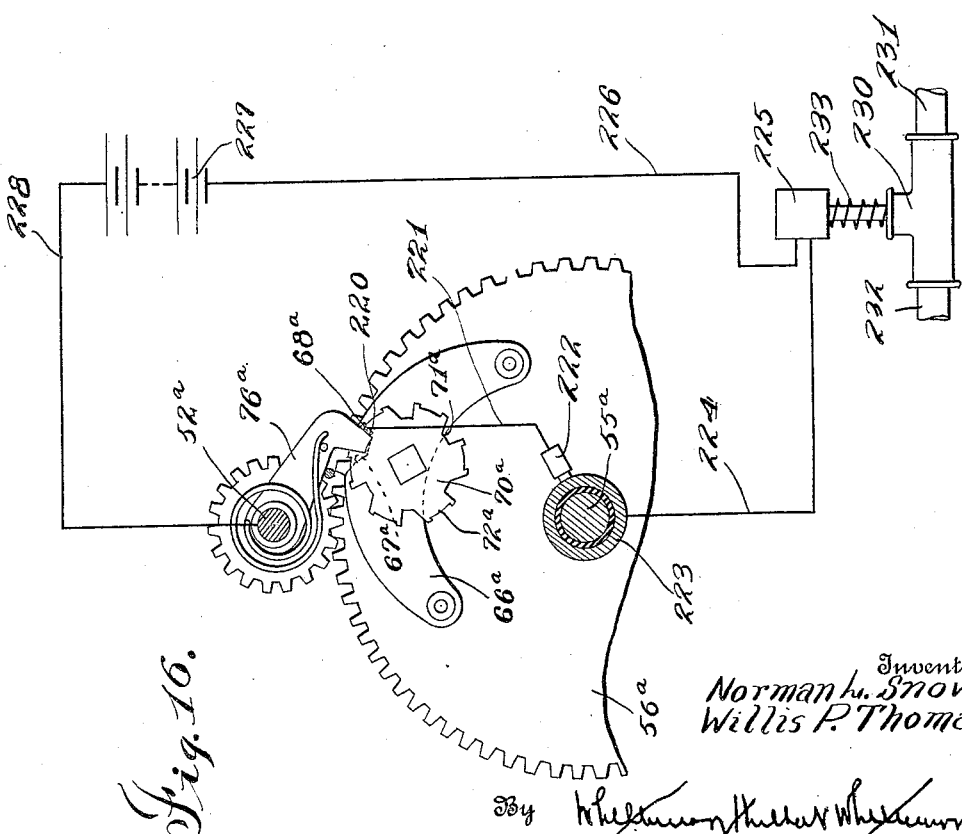
Inventors
Norman L. Snow
Willis P. Thomas

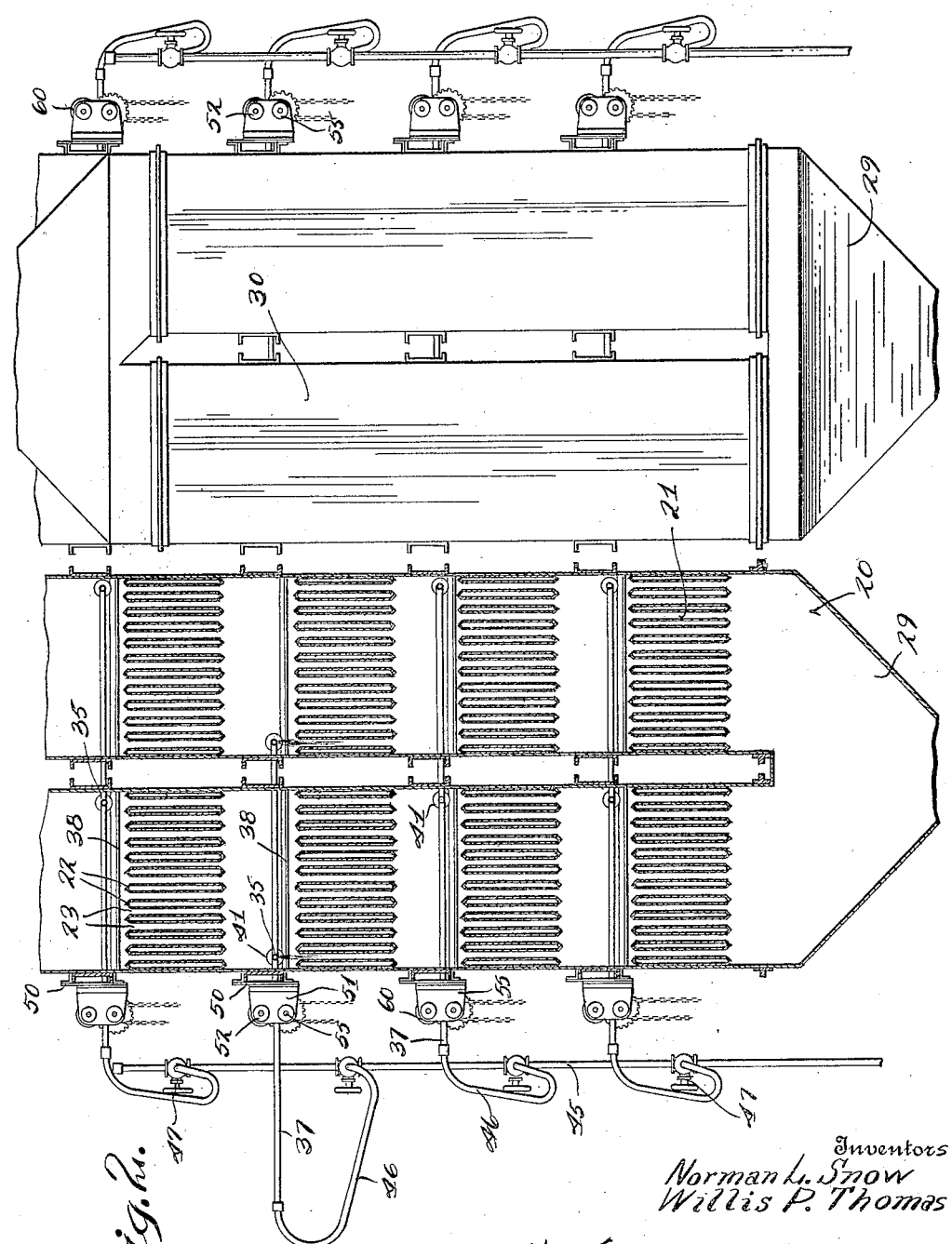

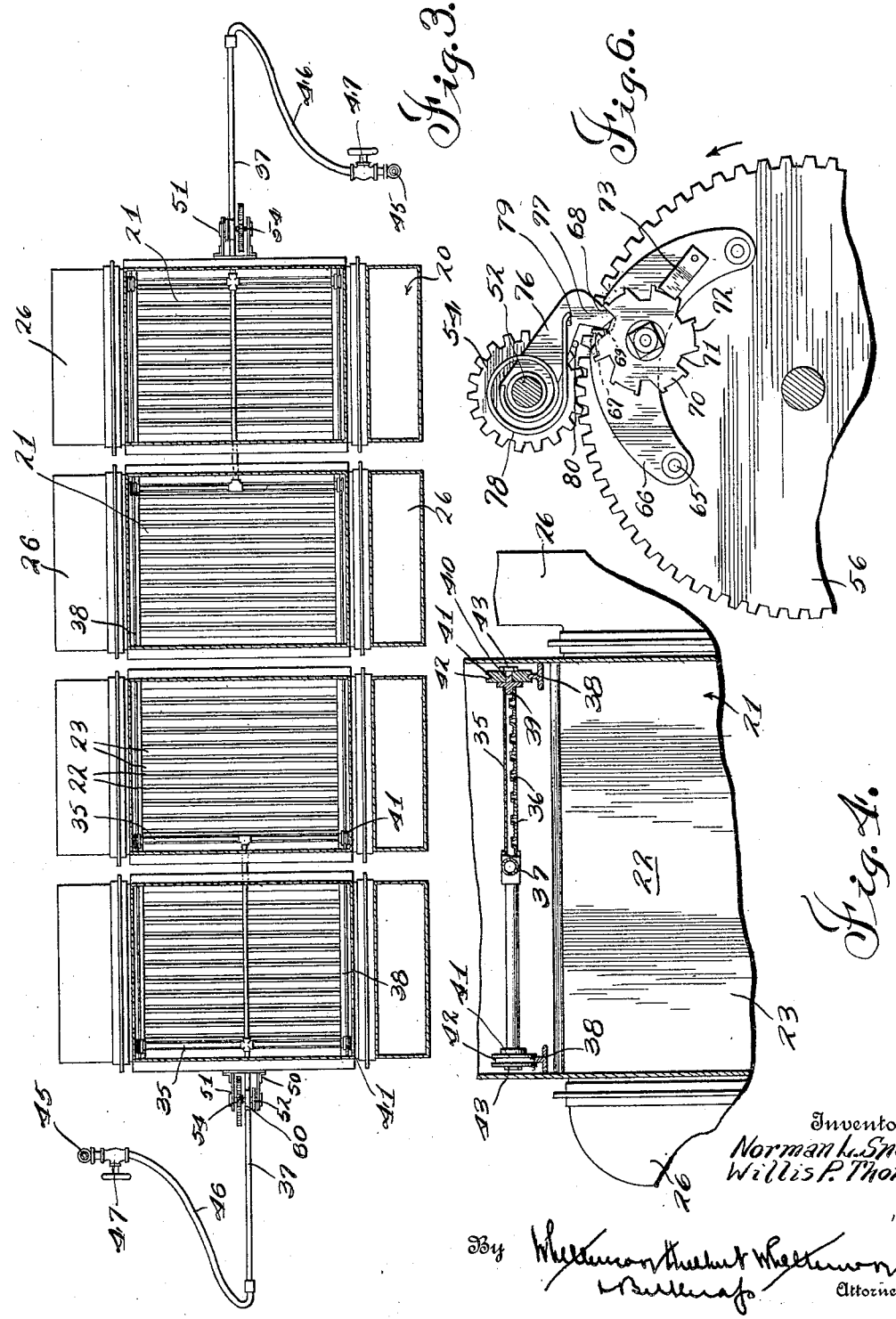

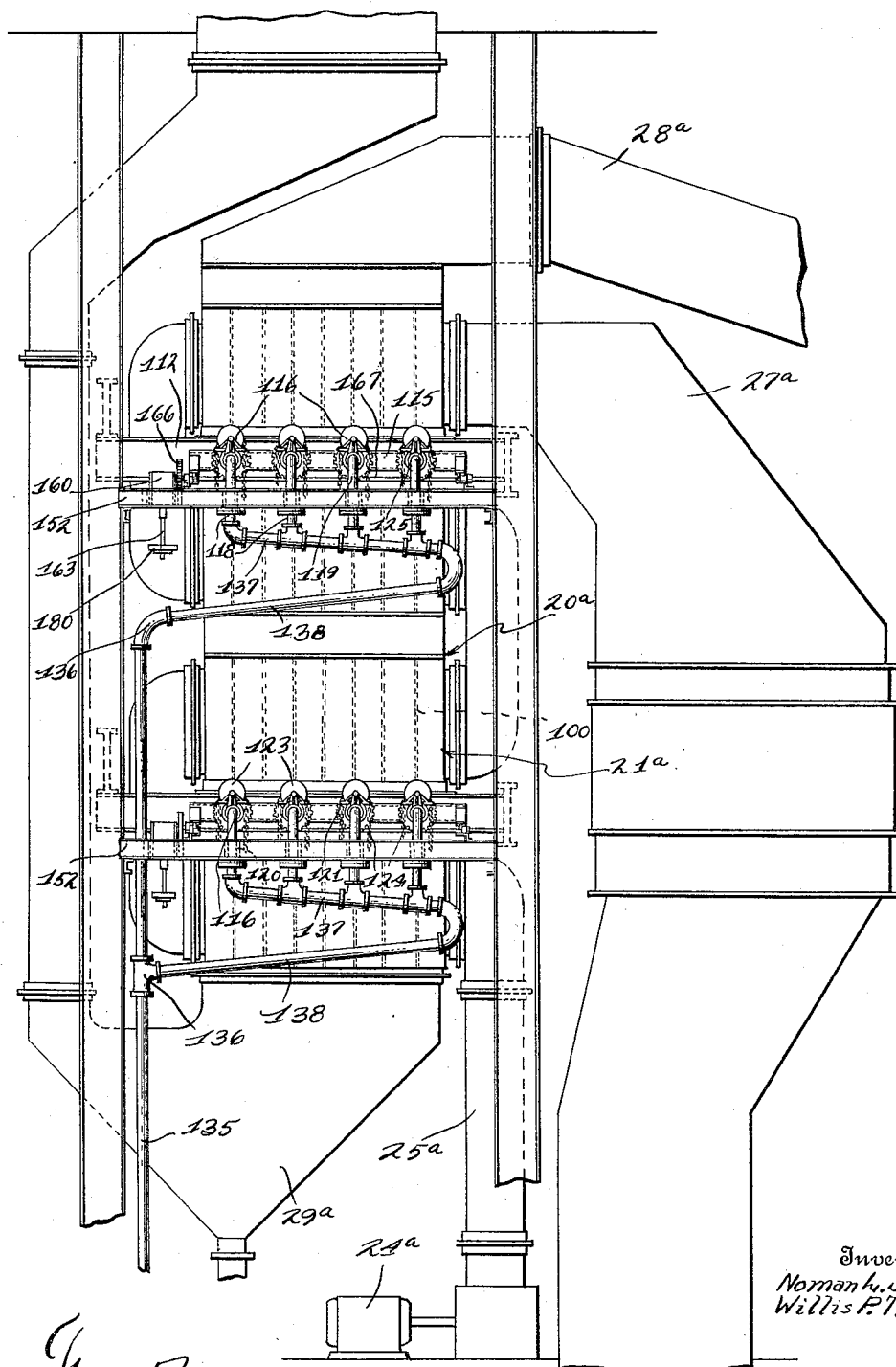

Inventor
Norman L. Snow
Willis P. Thomas

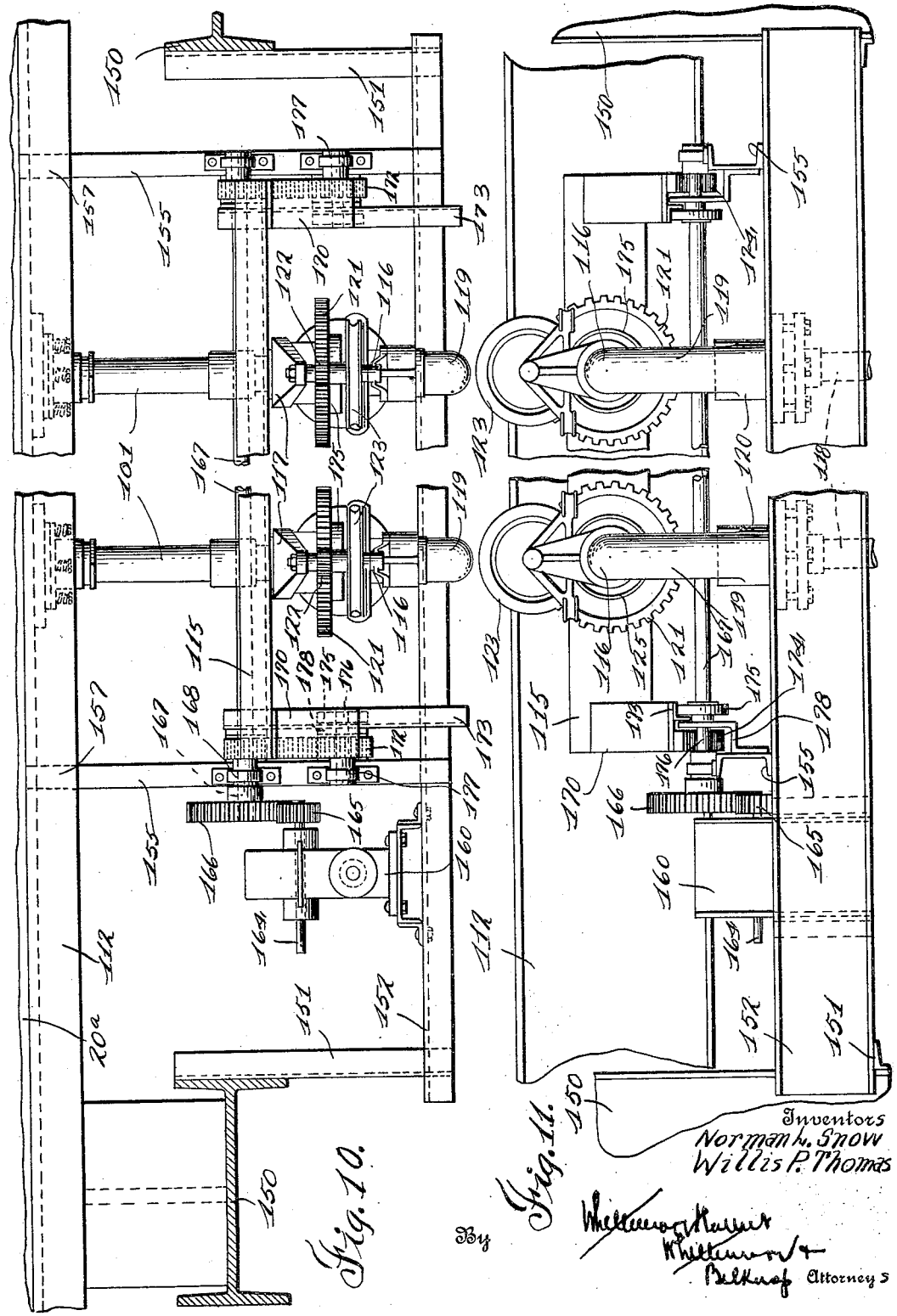

Inventors
Norman L. Snow
Willis P. Thomas

Patented Apr. 11, 1933

1,903,650

UNITED STATES PATENT OFFICE

NORMAN L. SNOW, OF NEW CANAAN, CONNECTICUT, AND WILLIS P. THOMAS, OF DETROIT, MICHIGAN, ASSIGNORS TO DIAMOND POWER SPECIALTY CORPORATION, OF DETROIT, MICHIGAN, A CORPORATION OF MICHIGAN

BLOWER FOR AIR HEATERS

Application filed July 19, 1928. Serial No. 293,934.

This invention relates to soot blowers and has particular reference to a soot blower adapted for use in connection with air heaters.

An object of this invention is to provide a construction in which one or more soot blowers are operable from the side of an air heater.

A further object of this invention is to provide a soot blower for an air heater adapted to discharge in the direction of the draft within the air heater, that is in the direction of the flow of heating gases through the air heater.

Another object of this invention is to provide a soot blower applicable to an air heater in which a single element is adapted to discharge a large volume of cleaning fluid down the gas passages of the air heater.

Still another object of this invention is to provide a construction in which a blower element is movable for alignment with the gas passages of an air heater and in which mechanism is provided for imparting a step by step motion to the blower element, whereby the blower element will discharge cleaning fluid down each gas passage of the air heater for the desired interval of time and whereby the discharge of the cleaning fluid on the air boxes of the air heater will be decreased to a minimum.

Still a further object of this invention is to provide a construction in which a plurality of blower elements, each adapted for rotation independently of the others, are mounted for movement as a unit within the air heater.

Another object of this invention is to provide a soot blower for an air heater in which the blower element is so located with respect to a dividing plate within the air heater as to discharge cleaning fluid on both sides of the said dividing plate.

The invention further contemplates the provision of a floating support for a blower element in combination with a tightly packed air seal whereby the blower element may be floatingly supported in the wall of the air heater without danger of permitting the escape of gases from within the air heater.

The invention further contemplates the provision of special bearings for the blower element, which bearings will permit a discharge of the cleaning fluid through certain predetermined desired arcs.

Still another object of this invention is to provide a construction in which a slight reciprocation of the blower element will effect the cleaning of a large area of the air heater.

And still further the invention contemplates the provision of an elongated blower element having a flexible connection intermediate its ends whereby all danger of binding of the blower element will be eliminated.

Other objects and advantages of this invention will become apparent as the following description proceeds, particularly when reference is had to the accompanying drawings wherein Figure 1 is a side elevational view of an air heater showing a soot blower constructed in accordance with this invention installed on the same.

Figure 2 is a front view partly in section and partly in elevation of the air heater shown in Figure 1.

Figure 3 is a sectional plan view through the air heater showing the arrangement of the soot blower within the same.

Figure 4 is a fragmentary sectional view through a portion of the air heater shown in Figure 1.

Figure 5 is an enlarged front elevational view of the mechanism for reciprocating the blower element.

Figure 6 is a fragmentary elevational view of a portion of the mechanism shown in Figure 5.

Figure 7 is a side elevational view of an air heater showing a modified form of soot blower applied to the same.

Figure 10 is a plan view of the mechanism for actuating the blower element shown installed on the air heater shown in Figure 7.

Figure 11 is a front elevational view of the structure shown in Figure 10.

Figure 16 is a semi-diagrammatic view of a slightly modified form of locking mechanism having means for controlling the flow of cleaning fluid.

Figure 1:
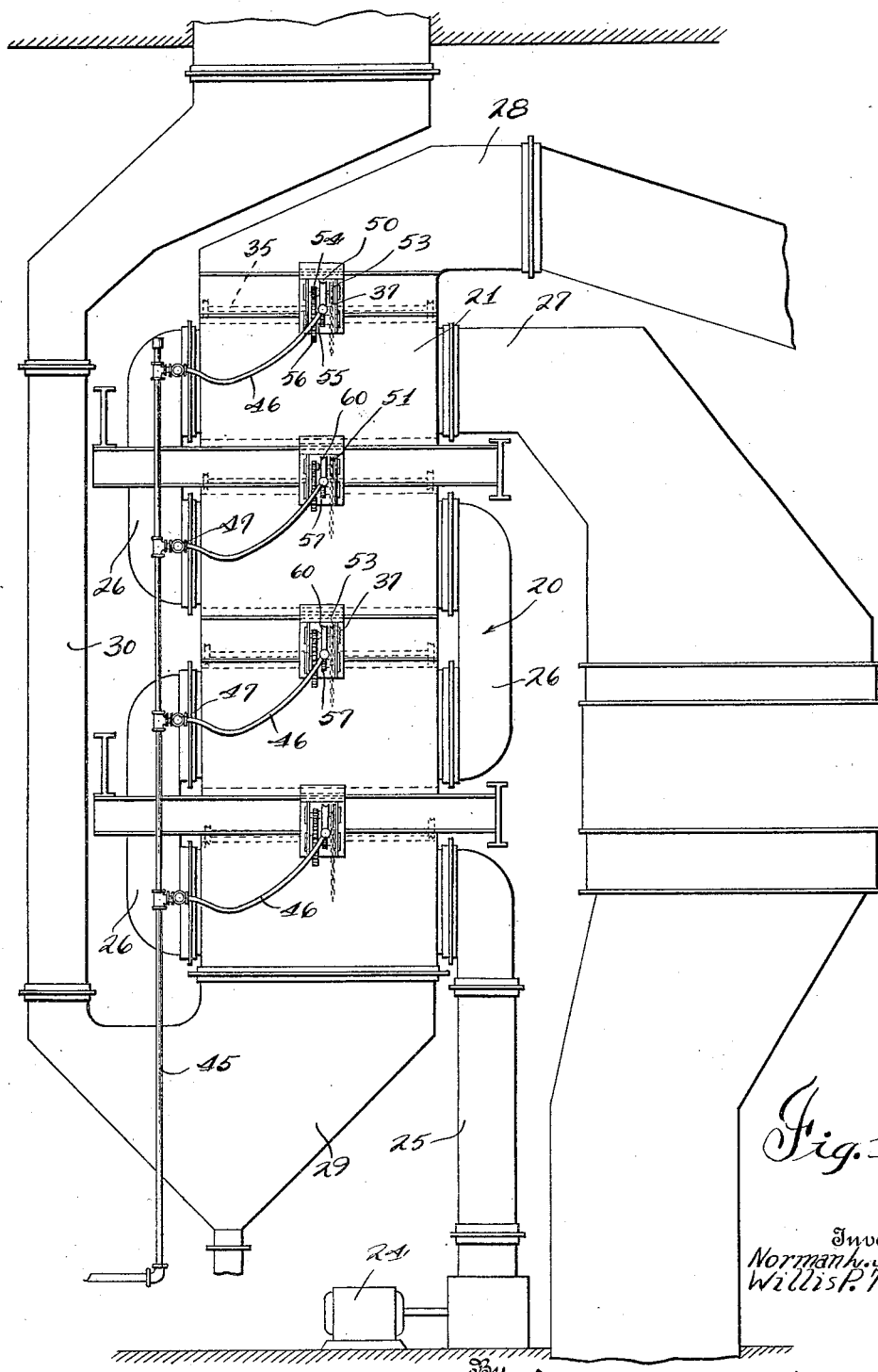

Referring now particularly to the drawings wherein like reference characters designate corresponding parts throughout all views, there is semi-diagrammatically illustrated an air heater 20. As illustrated the air heater 20 may be formed of a plurality of sections 21, each section including the traversely extending air boxes 22 spaced from each other to form the vertical gas passages 23. While it is obvious that any number of sections 21 may be used together to form a unit, the air heater 20 is disclosed as including sixteen sections arranged in a block four sections high, and four sections deep.

When the sections are arranged as illustrated air may be supplied from a fan designated generally by the reference character 24 to the conduit 25, which conduit opens into the bottom row of sections 21, the air flowing across these sections through the air boxes 22 to the opposite side of the air heater, where a housing 26 serves to direct this air to the row of sections above the bottom row, as will be readily apparent by reference to Figure 1 of the drawings. The air is thus directed back and forth across the air heater through the various rows of connections until it has passed through the uppermost row of sections where it is discharged as at 27 into any suitable receiving pipe or conduit. The heating medium such as waste gases from a boiler or any other source may be supplied to the top of the air heater as by a pipe or conduit 28, from which they flow directly through the gas passages 23 of the respective sections 21 to be discharged at the base of the air heater into a housing 29, from which they are conducted by means of a suitable pipe 30 to the chimney or any suitable exhaust. Obviously, the air flowing across the sections 21 through the air boxes 22 will be heated by the gases passing downwardly through the gas passages 23.

In the use of the air heater soot and other foreign products are carried down through the air heater by the heating medium and are deposited within the gas passages 23 and upon the sides of the air boxes 22. The invention contemplates the provision of means for discharging cleaning fluid through the gas passages 23 to clean these passages whereby a more effective heating of the air within the air boxes 22 will result. The invention further contemplates the provision of a construction in which the cleaning fluid will be discharged in the direction of flow of the heating gases, whereby the draft within the air heater will not be retarded and whereby the soot and so forth dislodged by the cleaning fluid will be carried on out the chimney or exhaust for the waste gases.

To effect the aforesaid cleaning of the gas passages 23 there are provided a plurality of blower elements 35. As illustrated in Figures 2 and 3, there is preferably provided one blower element 35 for each section 21, this blower element extending across its respective section in the same manner as do the air boxes 22. Each blower element is provided on its under face with a plurality of discharge nozzles 36, whereby when the nozzles on the blower element are aligned with one of the gas passages 23, a large volume of cleaning fluid from all the nozzles in the element 35 will be discharged downwardly through this gas passage.

For supplying cleaning fluid to the blower elements 35 supply pipes 37 are provided and as clearly illustrated in Figure 3 of the drawings, one supply pipe 37 may be provided for each pair of blower elements 35. When thus arranged, one blower element 35 may be located at the extreme inner end of its respective supply pipe 37, while a second blower element 35 may be arranged intermediate the ends of this supply pipe 37 to discharge cleaning fluid through the gas passages of the next adjacent horizontal section 21. It will thus be seen that one supply pipe 37 may supply cleaning fluid to two blower elements arranged in horizontally adjacent sections 21. Reciprocation of the supply pipe within the sections will cause the nozzles of the blower elements 35 to register with successive gas passages 23 in the two adjacent sections 21, whereby cleaning fluid will simultaneously be discharged down one gas passage in each section.

For supporting the blower elements for movement within the sections 21 and across the tops of the air boxes 22, the structure shown in Figure 4 may be provided. As illustrated a T-bar 38 may be arranged on each side of the section 21, these T-bars forming tracks for supporting the blower element 35. A plug 39 may be mounted in each end of the blower element 35, these plugs serving to close the ends of the blower element and being provided with reduced extensions 40 forming shafts for rollers 41 grooved as at 42 to engage the tracks 38. Suitable nuts 43 may be secured to the free ends of the shaft 40 to maintain the rollers 41 in position.

It will thus be seen that the blower elements 35 will be supported above the air boxes 22 for reciprocation within the sections 21, and that the rollers 41 engaging the tracks 38 will not only maintain the blower elements 35 in position, but will also facilitate a free movement of these blower elements. Obviously reciprocation of the supply pipe 37 will move the respective blower elements to align the discharge nozzles 36 of the blower elements with the gas passages 23. As illustrated in Figures 1 and 2 eight supply pipes 37, each carrying two blower elements 35 will be sufficient for effectively cleaning an air heater built up of sixteen sections 21. One supply pipe with its two blower elements is arranged above each pair of horizontal sections 21, the supply pipes for one half of the air heater being actuated from one side of the air heater, and the supply pipes for the other half being actuated from the other side. The blower elements and supply pipes are arranged one above the other all blowing downwardly through the gas passages 23 in the direction of flow of the heating medium. For supplying cleaning fluid to the supply pipes 37, a stand pipe 45 is arranged at each side of the air heater 20. These stand pipes 45 are connected to the supply pipes 37 by flexible pipes 46 of sufficient length to permit the desired reciprocation of the supply pipes 37. As clearly illustrated in Figure 2 of the drawings a valve 47 may be associated with each flexible pipe 46 to control the flow of cleaning fluid from the stand pipe 45 to the supply pipes 37.

In operation the blowers are preferably actuated as follows. The top units are first actuated, the uppermost supply pipes 37 being reciprocated to cause the blower elements 35, associated with the top sections 21 to blow downwardly through these top sections as before brought out. After the top sections have been cleaned, the next lower sections are cleaned, this operation continuing in order until the last section at the bottom is cleaned. In this manner, the sections are cleaned in the order of the draft through the sections and most effective results are obtained.

For effecting a reciprocation of the supply pipes 37, there is associated with each supply pipe the structure shown in Figure 5. As illustrated, this mechanism includes a supporting plate 50 secured to the side of the air heater adjacent the point where the supply pipe 37 projects through the air heater. This supporting plate 50 is substantially U-shaped in cross section being provided with the outwardly extending legs 51 forming bearings for the actuating shafts about to be described.

Rotatably supported by the legs 51 in spaced relation to the supporting plate 50 is a shaft 52 and rigidly secured to this shaft is a sheave wheel 53 and a gear 54. A second shaft 55 is supported by the legs 51 in spaced relation to the shaft 52 and this shaft carries a gear 56 adapted to be engaged by the gear 54 and a pinion 57 adapted to engage a rack 58 formed in the lower face of the supply pipe 37.

In accordance with the usual practice, a flexible chain (not shown) is adapted to be passed over the sheave wheel 53, whereby this sheave wheel may be rotated from a point adjacent the base or floor line of the air heater. Rotation of the sheave wheel 53 is directly transmitted to the gear 54, which gear in turn drives the gear 56. The pinion 57 rotates with the gear 56 and engages the rack 58 to reciprocate the supply pipe 37. If, desired, a chain guide 59 may be mounted on the shaft 52 to guide the flexible element (not shown), and a bracing roller 60 may be mounted for free rotation on the shaft 52, this roller being provided with a groove periphery 61 adapted to engage the upper face of the supply pipe 37. The roller 60 assures the maintaining of the rack 58 in engagement with the pinion 57.

As brought out before, it forms a feature of this invention to provide means for effecting a rapid travel of the blower elements 35 over the air boxes 22 and to compel a stopping of the blower elements in alignment with each gas passage 23. To accomplish this, the structure shown in Figure 6 is provided. Referring now particularly to Figure 6, it will be noted that there is rigidly secured to one face of the gear 56 as by the bolts 65, a crescent-shaped plate 66. This plate is provided with a notch 67 having the abrupt face 68 and the tapered face 69.

Rotatably carried by the plate 66 is a disk 70 provided on its periphery with the deep notches 71 and the relatively shallow notches 72. The disk 70 is so located that its notches 71 and 72 are adapted to align with the notch 67 in the plate 66. A spring 73 secured to the plate 66 yieldably engages the periphery of the disk 70 to yieldably retard rotation of this disk.

Pivotally supported on the shaft 52 is a dog 76, the free end 77 of which is adapted to engage in the notch 67 and the notches 71 and 72. A spring 78 has one end coiled around the point of support of the dog 76, and anchored in support 51 and its opposite end engaging a pin 79 carried by the dog 76, to urge the dog 76 downwardly into engagement with the said notches. Further a suitable pin 80 may be secured to the leg 51 to limit downward movement of the dog 76.

In operation, the pipe 37 is first moved outwardly to the position shown in Figure 3 after which sheave 53 is rotated to move the blower elements inwardly. During this inward movement the gear 56 will be moved in the direction of the arrow in Figure 6.

When, however, one of the large notches 71 of the disk 70 registers with the notch 67 in the plate 66, the dog 76 will assume the position shown in Figure 6, and will prevent further rotation of the gear 56 by engaging the abrupt edge 68 of the notch 67. To release this locking engagement of the dog 76 with the plate 66, the gear 56 must be slightly rotated in the opposite direction, whereupon the end 77 of the dog 76 will ride upon the tapered edge of the notch 71 to engage in the next adjacent shallow notch 72 in the disk 70. The gear 56 may then be rotated again in the direction indicated by the arrow during which rotation the end 77 of the dog 76 will be held out of engagement with the notch 67 by the shallow notch 72 in the disk 70. Movement of the gear 56 in the direction of the arrow with the dog 76 engaging in the shallow notch 72 will rotate the disk 70 to position the next deep notch 71 in alignment with the notch 67, whereupon when the gear 56 has made a complete revolution to again bring the notch 67 adjacent the dog 76 the dog will again engage in the notch 67 to again lock the gear 56 against rotation. Obviously, any number of shallow notches 72 may be positioned between the deep notches 71 to effect a locking of the gear 56 after any number of revolutions. The arrangement is such, however, that the gear 56 is locked against rotation when the supply pipe 37 has been moved far enough to position the blower elements 35 over one of the gas passages 23, so that the mechanism compels a stopping of the blower element over each gas passage to effect a blowing of the cleaning fluid down the gas passage. Upon a release of the locking mechanism by a slight reverse rotation of the gear 56, the gear 56 may then be rapidly rotated by the chain or flexible element (not shown) to rapidly move the supply pipe 37 and the blower elements until the blower elements are positioned over the next gas passages, whereupon the gear 56 will again be locked and the blower element held in blowing position for a short interval of time.

From the above, it is believed that the operation of this form of the construction will be readily apparent. The normal positions of the blower elements 35 are at the inner ends of their respective sections 21 with the supply pipes 37 substantially wholly within the sections 21. To start the cleaning operation the uppermost blower elements are first moved to the position shown in Figure 3 when by opening the uppermost valve 47 cleaning fluid will be supplied to its respective supply pipe 37 and will be discharged through two of the blower elements 35 down the outer end gas passages 23 of the uppermost sections. The sheave wheel 53 may then be rapidly rotated to move the supply pipe 37 inwardly a predetermined amount or until the locking dog 76 engages in the notch 67 of the plate 66, at which time the blower elements 35 will be positioned over the next adjacent gas passages of each section. This operation may be repeated until the blower elements 35 have blown down all of the gas passages at which time the blower elements will have again reached their normal position. It will be apparent that, during outward movement of the blower elements, the locking dog 76 will not operate to lock the gear 56.

It will be apparent that the construction provides for actuating the blower elements from the sides of the air heater, that the blower elements will discharge cleaning fluid in the direction of flow of the heating gases within the air heater, that the single elements will discharge a large volume of cleaning fluid down the respective gas passages and that the step by step mechanism provided will facilitate a rapid travel of the blower elements over the air boxes 22, and will compel a stopping of the blower elements in alignment with each of the gas passages 23.

In Figures 7 to 12 inclusive, there is shown a modified form of construction in which a plurality of blower elements are mounted for one type of movement independently of each other, but in which means are provided for imparting a second type of movement to all of the blowers as a unit. In this form of construction, a plurality of blower elements are mounted for reciprocation as a unit and for rotation independently of each other, whereby the necessity of providing a large number of traversing mechanisms is eliminated. This principle will be found quite desirable in a number of installations since it provides for the movement of a plurality of units with a single mechanism thus reducing the cost of installation. Referring now particularly to those views, $20^a$ designates an air heater formed of a plurality of sections $21^a$, each section being provided with the air boxes $22^a$ and the gas passages $23^a$. The heater further includes the blower $24^a$, air inlet pipe $25^a$, air outlet $27^a$, the inlet $28^a$ for the heating medium and the outlet $29^a$ for the heating medium, all of this construction being similar to the construction shown in connection with the first form described.

Figure 12:
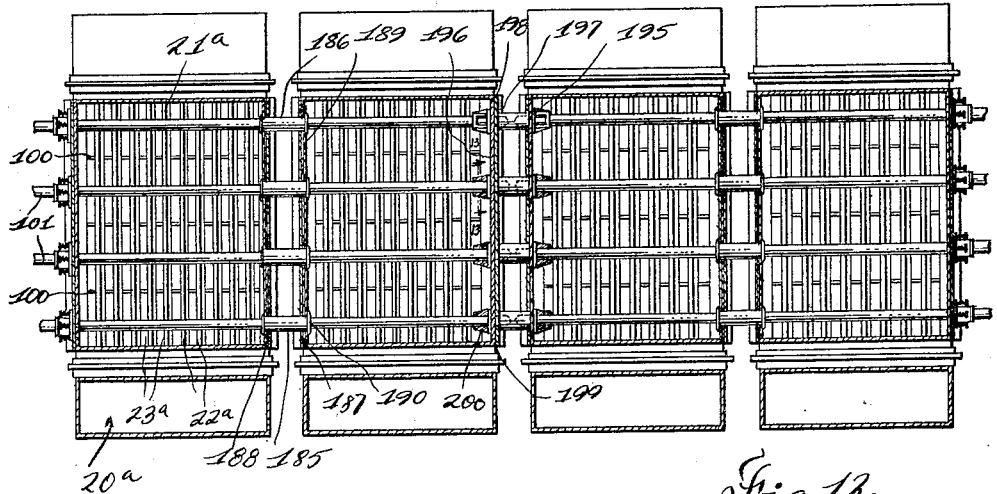
Figure 12 is a horizontal sectional view through the air heater shown in Figure 7.

In this form of construction, however, means are provided for discharging the cleaning fluid on opposite sides of the plates 100, which divide the gas passages $23^a$ within the sections $21^a$. Accordingly as illustrated in Figure 12 of the drawings, there is mounted above alternate plates 100, blower elements 101, each element being adapted to discharge cleaning fluid on opposite sides of the plate 100 over which it is mounted. In this form of construction, four blower elements 101 are provided to effect a cleaning of a group of four sections $21^a$. Each blower element 101 is of a sufficient length to extend across two adjacent sections $21^a$ arranged in the same horizontal plane and each blower element 101 is adapted to be rotated to discharge cleaning fluid through the gas passages of the sections 21ª immediately above and below its axis. Accordingly one group of four blower elements is arranged between the first and second vertical rows of sections 21ª, while a second group of blower elements is arranged between the third and four vertical rows of sections 21ª, as will be readily apparent by reference to Figure 7 of the drawings.

Figure 8:
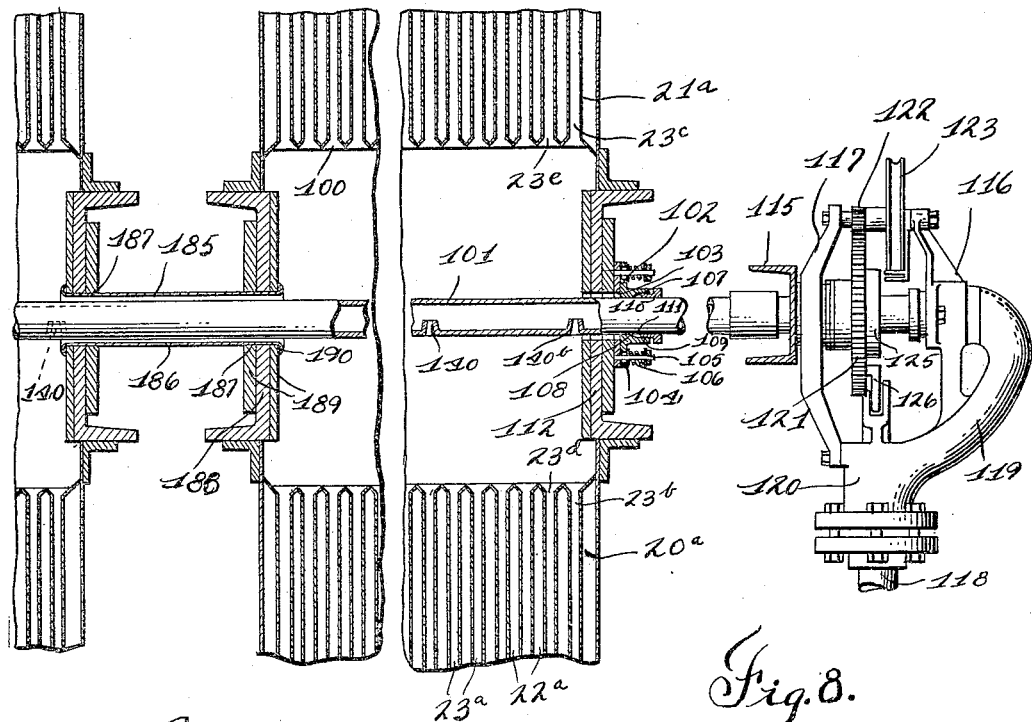
Figure 8 is a section through the air heater shown in Figure 7.

As clearly illustrated in Figure 8 of the drawings, each blower element 101 extends between the sections 21ª and is mounted for reciprocation and rotation between these sections. For effecting a floating gas tight support for each blower element 101 where the same projects through the side of the air heater 20ª, there is provided a plate 102 provided with the opening 103 forming a bearing for the blower element 101 and provided with slots 104 through which pins 105 secured to the air heater 20ª are adapted to project. Suitable springs 106 maintain the plate 102 against the outer face of the air heater 20ª, while permitting a slight movement of the plate 102 to float the blower element 101. The plate 102 is provided with a boss 107 counter-bored as at 108 which is threaded as at 109 to receive a gland 110. Packing 111 is arranged within the counter-bored portion 108 and is adapted to be compressed by the gland 110 when the same is threaded into the counterbore. The gland 110 and packing 111 cooperating with the plate 102 will form a fluid tight bearing for the blower element 101, while permitting floating of this blower element relative to the air heater. As illustrated, the plate 102 may be positioned adjacent the frame member 112 provided for securing two adjacent sections 21ª together.

The four elements 101 of each group project outwardly through the side of the air heater 20ª as clearly illustrated in Figure 8 of the drawings, and project through a cross member or traveling carriage 115 in which they are mounted for rotation but prevented from longitudinal movement. The blower elements of each group may therefore be reciprocated as a unit by imparting the proper movement to the cross member 115 in a manner hereinafter to be more fully described.

The blower elements 101 extend beyond the cross member 115 and each element has its free end journaled in a head designated generally by the reference character 116. Each head 116 may be secured to the cross member 115 as by the brace 117 and includes the cleaning fluid supply pipe 118 and the goose-neck 119. A valve (not shown) mounted within the valve casing 120 controls the flow of cleaning fluid from the supply pipe 118 to the goose-neck 119, and from the goose-neck 119 the cleaning fluid flows to the blower element 101 in accordance with the usual practice.

Each head 116 includes means for imparting rotation to its respective blower element, this means including a gear 121 rigidly carried by the blower element 101, which gear is engaged by a pinion 122 mounted on a shaft with a sheave wheel 123. Suitable flexible elements such as chain 124 engage the sheave wheels 123, whereby the sheave wheels may be rotated from the floor below the air heater.

For controlling the flow of cleaning fluid from each supply pipe 118 to its respective blower element 101, a cam 125 is associated with each gear 121, this cam engaging a lever 126 pivotally carried by the head 116, which lever in turn engages the valve stem of the valve (not shown). Rotation of the gear 121 effects a rotation of the cam 125 and this cam by engaging the lever 126 depresses the same to actuate the valve in dependence upon the rotative position of the blower element.

Cleaning fluid is supplied to the respective supply pipes 118 by the arrangement shown in Figure 7. A cleaning fluid supply pipe 135 extends upwardly adjacent the end of the air heater and is provided with the branch fittings 136 extending below each group of blower elements 101. The four supply pipes 118 of each group are connected to a group supply pipe 137 and this group supply pipe is connected to the adjacent fitting 136, as by a flexible connection 138. Cleaning fluid supplied to the pipe 135 flows through the fittings 136, the flexible connections 138 and to the group supply pipes 137, from which it flows through the individual supply pipes 118. The flow of the cleaning fluid from the individual supply pipes 118 to the blower elements 101 is controlled in the manner brought out above.

As clearly illustrated in Figure 8 of the drawings, each blower element 101 is provided with a plurality of longitudinally spaced discharge nozzles 140. In operation, each discharge nozzle 140 is adapted to discharge cleaning fluid in six different positions. The first or normal position is that shown in Figure 8, wherein nozzle 140ᵇ is adapted to discharge cleaning fluid to gas passages 23ᵇ and 23ᶜ. After this nozzle has discharged cleaning fluid into these two gas passages, the blower element is moved longitudinally to position the nozzle 140ᵇ in alignment with the next adjacent gas passage 23ᵈ and 23ᵉ, whereupon the blower element 101 is again rotated and the cleaning fluid is discharged from the nozzle 140ᵇ into the gas passages 23ᵈ and 23ᵉ. This operation is continued through a predetermined number of longitudinal advances of the blower element 101, or until the plurality of nozzles 140 have blown through all of the gas passages 23ª. In actual use, it has been found desirable to advance the blower element 101 a sufficient distance to cause each nozzle to blow through six gas passages, whereby the longitudinal movement of the elements 101 will be relatively small, but it is to be clearly understood that the number of advances of the blower element 101 may be readily varied as the construction of the air heater warrants.

Figure 9:
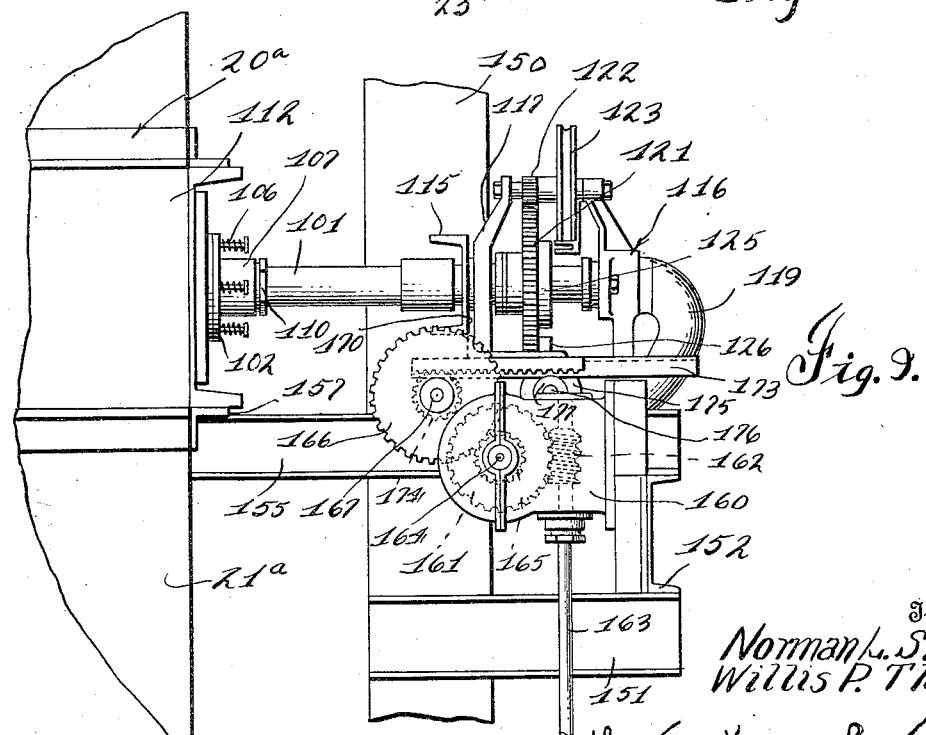
Figure 9 is a front elevational view of the air heater shown in Figure 7, this view including the mechanism for actuating the blower element.

As brought out before, all the blower elements of each group are secured to a cross member 115 whereby all the blower elements of each group may be reciprocated as a unit. To effect this reciprocation the structure shown in Figures 9, 10 and 11 is provided.

Referring now particularly to these views, the reference characters 150 designate the corner frame members of the air heater 20$^a$, there being one frame member for each corner. Secured to each frame member is a laterally projecting arm 151, the arms 151 being connected at their free ends by a frame member 152, which extends across the end of the air heater. Suitable bearing supports 155 are carried by the frame member 152 and these bearing supports may be extended and secured to the end of the air heater as at 157.

Secured to the frame member 152 is a housing 160 in which is journaled a worm wheel 161 adapted to be driven by a worm 162 mounted on the end of a vertically extending shaft 163. The shaft 164 of the worm wheel 161 carries at its one end a pinion 165 arranged in meshing engagement with a gear wheel 166 mounted on a shaft 167 journaled in the bearings 168 carried by the bearing supports 155 on opposite sides of the air heater.

Secured to the cross member 115 adjacent each end is an angle plate 170 and to the horizontal leg 171 of each angle plate there is secured a rack 172 and a guide way 173. The racks are adapted to travel adjacent the supports 155 and are adapted to be driven by pinions 174 mounted on the shaft 167 at opposite sides of the air heater. The bars 173 are adapted to run on rollers 175, each roller being mounted on a shaft 176, journaled at one end in a bearing 177 on the support 155 and journaled at an intermediate point in one leg of a Z-shaped member 178 secured to the support 155. The bars 173 and rollers 175 aid in preventing a binding between the pinion 174 and racks 172.

From the above it will be apparent that rotation of the shaft 163 will reciprocate the cross member 115 and its respective group of blower elements 101. To impart a step by step movement to the cross member 115, so as to assure an alignment of the nozzles 140 with the gas passages 23$^a$, a suitable step by step mechanism designated generally by the reference character 180 may be secured to the shaft 163 at any desired point. This step by step mechanism may be similar to that disclosed in Figure 6 of the drawings and will therefore not be described in detail.

As clearly illustrated in Figures 8 and 12 of the drawings, each blower element projects through two sections 21$^a$. Further it will be noted by reference to these figures that for each horizontal row of sections 21$^a$ two groups of blower elements are provided, one group projecting into the air heater from one side and the other group projecting into the air heater from the other side. Obviously, since these blower elements must be mounted for both reciprocation and rotation, suitable bearings must be provided which will permit the desired discharge of cleaning fluid from the blower elements, while at the same time permitting the desired reciprocation and rotation of the elements. To accomplish this, the bearings shown in Figures 8 and 12 are provided.

Referring then particularly to Figures 8 and 12, it will be noted that the air heater is provided with two types of bearings, one for supporting the element intermediate its ends, and the other for supporting the distal ends of the elements. The reference character 185 designates generally the bearing support for the intermediate portion of each blower element 101. This bearing support comprises a tube 186 expanded into the openings 187 of the frame members 188 which secure the adjacent sections 21$^a$ to each other. If desired suitable reinforcing plates 189 may be arranged on either side of each frame member 188, and the tube 186 may be flanged over at 190 to engage one face of each plate 189. The tube 186 is of a sufficient diameter to receive the blower element 101, while permitting reciprocation and rotation of this element.

Figure 14:
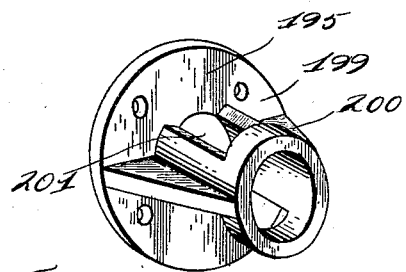
Figure 14 is a detailed perspective view of the element shown in Figure 13.
Figure 13:
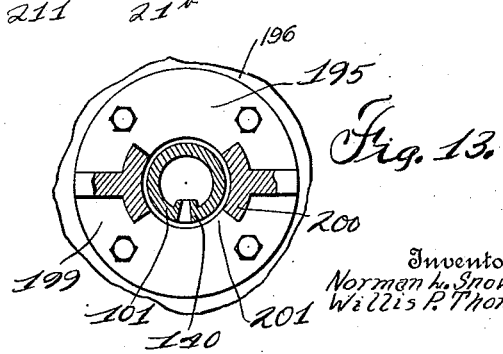
Figure 13 is an enlarged sectional view taken substantially on the line 13—13 of Figure 12.

The bearing for the distal end of each blower element is designated generally by the reference character 195. In constructing this bearing, provision must be made to firmly support the free end of each blower element 101, while at the same time permitting a discharge of cleaning fluid from points adjacent the free end of each blower element in order that the gas passages arranged immediately adjacent the end of each section 21$^a$, will be cleaned during the operation of the blower. Accordingly, as illustrated, the frame member 196 which serves to secure the intermediate sections 21$^a$ together is apertured as at 197 to receive the free end of the blower element. Secured to the outer face of the frame member 196 is a reinforcing plate 198, while secured to the inner face of the frame member 196 is a plate 199 having the boss 200, the plate and boss being bored to receive the tube 101. As illustrated in Figures 13 and 14 of the drawings, the boss 200 is cut away at diametrically opposite points to provide the slots 201 through which cleaning fluid from the nozzles 140 may be discharged. The slots 201 are arranged above and below the horizontal plane of the boss 200, whereby the nozzles 140 may discharge above and below the longitudinal axis of the blower element 101.

From the above, it is believed that the operation of this form of construction will be readily apparent. The blower elements are arranged in groups of four, although it will be readily apparent that a greater or less number of elements may be arranged in each group. Each group of elements is arranged to blow downwardly through two sections 21ª and upwardly through the two sections 21ª arranged immediately above the first mentioned sections. The blower elements of each group are adapted to be reciprocated as a unit by the shaft 163 to position the nozzles 140 in alignment with the gas passages 23ª. When the group of blower elements has been moved to position the nozzles in alignment with one series of gas passages 23ª, the blower elements 101 may be individually rotated to effect a discharge of cleaning fluid through the said gas passages. Rotation of each blower element by its respective head 116 will effect a supply of cleaning fluid to the respective element, whereby cleaning fluid will only be discharged from the blower elements during the desired time intervals.

The four heads being mounted on one traveling carriage require only a single traversing mechanism and this mechanism may be mounted at the side of the air heater. Each blower element is arranged directly over a dividing plate within the air heater so that cleaning fluid will be discharged down both sides of this dividing plate. The bearing supports for the blower elements where they project through the air heater permit a floating of the blower element, while preventing the escape of gases from the interior of the air heater, and the bearing supports for the distal ends of the blower elements permit a discharge of cleaning fluid over the desired arcs, while permitting a reciprocation of the blower elements the desired amount. By providing a plurality of discharge nozzles for each blower element, the blower elements need only be reciprocated a short distance to effect a complete cleaning of the air heater.

Figure 15:
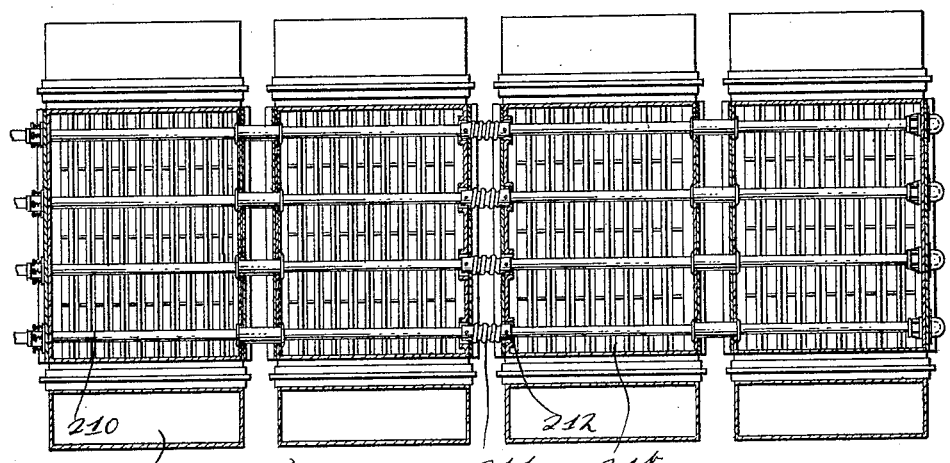
Figure 15 is a horizontal sectional view similar to Figure 11 showing still another slightly modified form of blower element.

In Figure 15, a still further modification is shown, the arrangement being generally similar to that disclosed in Figure 12. In this form of construction, the two horizontally aligned groups of blower elements are combined into one group, the blower elements being extended to project through four horizontal sections 21ª. Obviously, in this form of construction, a single actuating mechanism may be arranged at one side of the air heater and this mechanism will actuate a blower element which extends entirely across all the sections of the air heater.

Referring then particularly to Figure 15, the reference character 210 designates the blower element which as illustrated, is of a sufficient length to extend through four sections 21ᵇ. These blower elements are arranged in groups of four adapted to be reciprocated in the same manner as the group of elements 101, and each element 210 is adapted to be rotated by the same mechanism as that disclosed for rotating each blower element 101. In this form of construction, however, there is provided a flexible joint intermediate the ends of the blower element 210, whereby the liability of binding of the element by reason of warping is eliminated. Accordingly the element 210 is broken intermediate its ends and the two sections of the element are then connected by a flexible bellows-like element 211. The ends of this flexible element may be secured to the sections of the blower element 210, as by the set screws 212, as will be readily apparent by reference to Figure 15.

By virtue of the flexible connection 211, the two sections of the blower element 210 may be reciprocated and rotated as a unit, while all liability of binding of the element by reason of warping will be eliminated. The operation of this form of construction will be substantially the same as the operation described in connection with the form shown in Figures 7 to 14 inclusive.

In Figure 16 there is semi-diagrammatically illustrated a slightly modified form of locking mechanism adapted to be utilized in connection with either of the arrangements shown, this locking mechanism being provided with means for controlling the flow of cleaning fluid to the blower elements and being so arranged that the flow of cleaning fluid to the blower elements will be cut off when the blower elements are passing over the air boxes. Referring particularly to this figure the major portion of the structure is the same as that shown in Figure 6, this structure including the gear 56ª carrying the crescent shaped plate 66ª, which plate is provided with the notch 67ª having the abrupt face 68ª. Rotatably carried by the plate 66ª is the disk 70ª provided on its periphery with the notches 71ª and 72ª adapted to register with the notch 67ª. The dog 76ª is mounted for engagement in the notches 67ª, 71ª and 72ª to lock the gear 56ª against rotation as before brought out.

In this form of construction, however, the abrupt face 68ª is provided with a contact plate 220 which forms one end of an electrical circuit including the lead 221 secured to the gear 56ª. The lead 221 may be provided with a brush 222 adapted to constantly engage a contact bushing 223 rigidly mounted on the bearing for the shaft 55ª. From the bushing 223 the electrical circuit is continued by the conductor 224 to a suitable solenoid designated generally by the reference character 225. From the solenoid 225 a conductor 226 connects with a suitable source of electrical current designated generally by the reference character 227, this source being in turn connected by a conductor 228 to the shaft 52$^a$ on which the pawl 76$^a$ is pivotally mounted. The pawl 76$^a$ engages the contact plate 220 when it is in its lowermost position or in engagement with the abrupt face 68$^a$ thus completing the circuit through the solenoid 225.

The solenoid 225 is adapted to actuate a valve 230 which controls the flow of cleaning fluid from a suitable supply pipe 231 to the conduit 232 which delivers the cleaning fluid to the blower element associated with the traversing mechanism adapted to be locked by the locking mechanism above described. In operation therefore when the gear 56$^a$ is being rotated to move the blower elements from one gas passage to the next gas passage, the dog 76$^a$ will be moved out of engagement with the notch 67$^a$ in accordance with the operation of the locking mechanism as before brought out. This raising of the dog 76$^a$ will break the circuit through the solenoid 225 whereby a spring 233 will effect a closing of the valve 230 to prevent the flow of cleaning fluid to the respective blower elements. When, however, the blower elements have become aligned with the next gas passage the dog 76$^a$ will again engage in the notch 67$^a$, whereupon the pawl will engage the contact plate 220 to again close the circuit through the solenoid 225 thus actuating this solenoid to open the valve 230 to permit the flow of cleaning fluid to the respective blower elements. It will be seen that by this arrangement the flow of cleaning fluid to the blower elements will be positively cut off during travel of the blower elements from one gas passage to the next, thus preventing the discharge of cleaning fluid on the air boxes. When, however, the blower elements are in alignment with the gas passages the circuit will be closed to effect a discharge of the cleaning fluid down the gas passage. Obviously this control of the flow of cleaning fluid to the blower elements might be accomplished in any one of a number of different ways. For example, the gear 56$^a$ or the pawl 76$^a$ might be mounted to actuate a pilot valve to control the flow of cleaning fluid to a piston actuated main valve, whereby the pressure of the cleaning fluid could be utilized for actuating the main valve for controlling the flow of cleaning fluid to the blower elements. The invention is therefore not to be construed as limited to the specific arrangement shown since various mechanisms may be provided for controlling the flow of cleaning fluid to the blower elements in dependence upon the operation of the locking mechanism.

While several embodiments of the inventive idea have been described and disclosed with considerable detail, it is to be clearly understood that the description is for the purposes of illustration only. The right is therefore reserved to make such changes in the details of construction and arrangement of parts as will fall within the purview of the attached claims.

What we claim as our invention is:

1. In combination, an air heater having a plurality of air boxes, the said air boxes being spaced from each other by gas passages, a blower element for discharging a cleaning fluid through the said gas passages, means for moving the said blower element, and means cooperating with said last mentioned means for effecting a rapid movement of said blower element past each of said air boxes and for compelling a stopping of the movement of said blower element in alignment with each of said gas passages.

2. The combination with an air heater having a plurality of aligned sections, each section being provided with a plurality of air boxes spaced by gas passages, of a cleaning fluid supply pipe mounted for reciprocation above said aligned sections, a plurality of blower elements carried by said supply pipe, one of said blower elements being arranged above each section, and means for reciprocating said supply pipe to align each blower element with the gas passages of its respective section.

3. The combination with an air heater having a plurality of aligned sections, each section being provided with a plurality of air boxes spaced by gas passages, of a cleaning fluid supply pipe mounted for reciprocation above said aligned sections, a plurality of blower elements carried by said supply pipe, one of said blower elements being arranged above each section, and means for reciprocating said supply pipe to align each blower element with the gas passages of its respective section, said means including a rack movable with said supply pipe, and a pinion gear engageable with said rack.

4. The combination with an air heater having a plurality of aligned sections, each section being provided with a plurality of air boxes spaced by gas passages, of a cleaning fluid supply pipe mounted for reciprocation above said aligned sections, a plurality of blower elements carried by said supply pipe, one of said blower elements being arranged above each section, and means for reciprocating said supply pipe to align each blower element with the gas passages of its respective section, said means including a rack, a pinion engageable with said rack, means for rotating said pinion, and means for periodically locking said pinion against rotation.

5. The combination with an air heater having a plurality of gas passages, of means for discharging a cleaning fluid into said gas passages, said means including a plurality of blower elements arranged adjacent said gas passages, and means for imparting a step by step movement in the direction of the longitudinal axes of said blower elements to all of said blower elements as a unit.

6. In combination a blower element, means for moving said blower element, means for periodically locking said blower element against movement, and means for controlling the flow of cleaning fluid to the blower element operating upon the locking of said blower element against movement.

7. In combination, an air heater having a plurality of air boxes, the said air boxes being spaced from each other by gas passages, a blower element for discharging a cleaning fluid through the said gas passages, means for moving the said blower element to align the same with the said gas passages, means for compelling a stopping of the movement of said blower element when the same is in alignment with each of the said gas passages, and means operable by said last mentioned means for controlling the flow of cleaning fluid to the said blower element.

8. In combination, a blower element movable to three or more spaced blowing positions, means for moving said blower element successively to said positions whereby said blower element is temporarily brought to rest at each of said positions, and means for controlling the flow of cleaning fluid to said blower element, said means being operable to limit the supply of cleaning fluid to said blower element to periods when said blower element is in said blowing positions.

9. In combination, a blower element, means for imparting a step by step movement to said blower element to move the same progressively to a plurality of spaced blowing positions and to bring the blower element to rest temporarily at each of said positions, means for supplying cleaning fluid to said blower element, and means operable to limit the supply of cleaning fluid to said element to periods when said element is in said blowing positions.

10. In combination, a blower element movable to three or more spaced blowing positions, means for so moving said blower element that the same is temporarily brought to rest at each of said positions, a valve for controlling the flow of cleaning fluid to said blower element, and means operable to effect a closing of said valve during the movement of said blower element between said positions.

11. In combination, a blower element movable to three or more spaced blowing positions, means for moving said blower element to said positions, and means for controlling the supply of cleaning fluid to said blower element operable to limit the supply of cleaning fluid to said element to periods when said element is in said blowing positions.

12. In combination, a blower element for discharging cleaning fluid adjacent surfaces to be cleaned, means for moving said blower element relative to said surfaces, means for interrupting the movement of said blower element to locate the same in a predetermined blowing position, and means operable in dependence upon actuation of said interrupting means for controlling the flow of cleaning fluid to the blower element.

13. In combination, a blower element movable to a plurality of blowing positions, means for moving said blower element, means for locking said blower element against movement at each of said positions, and means operating upon actuation of said last mentioned means for controlling the supply of cleaning fluid to said blower element.

14. A soot blower including in combination a plurality of blower elements mounted for one type of movement independently of each other and means for imparting a second type of movement to all of said blower elements as a unit.

15. A soot blower including in combination a plurality of blower elements mounted for rotation independently of each other and means for reciprocating all of said blower elements as a unit.

16. A soot blower for air heaters, including in combination a plurality of blower elements mounted for rotary movement independently of each other, and means for moving all of said blower elements together as a unit, said means including a traveling carriage in which all of said blower elements are journaled the journaling of said blower elements in said carriage providing for the said movement of the blower elements independently of each other.

17. The combination with an air heater having a plurality of gas passages, of means for discharging a cleaning fluid into said gas passages, said means including a plurality of blower elements arranged adjacent said gas passages, and means for imparting a step by step longitudinal movement to all of said blower elements as a unit, said last mentioned means including a traveling carriage mounting all of said blower elements, a traversing mechanism for said carriage and means for periodically locking said traversing mechanism against operation.

18. The combination with an air heater having a plurality of gas passages and having a plate for dividing said gas passages into sections, of a blower element mounted for rotation over said plate, the said blower element being adapted to discharge cleaning fluid down both sides of said plate.

19. The combination with an air heater having a plurality of gas passages and having a plurality of plates for dividing said gas passages into sections, of a plurality of blower elements, each element being mounted over a plate and being adapted to discharge cleaning fluid down opposite sides of its respective plate, and means for imparting a longitudinal movement to all of said blower elements as a unit.

20. In combination, a heat exchange unit, a blower element projecting through the side of said unit, a floating support for said blower element where the same projects through the side of said unit, said support being provided with a chamber which surrounds said blower element and which is adapted to receive packing, and means carried by said support for retaining packing in said chamber.

21. In combination, an air heater, a blower element projecting through the side of said air heater, and a packed floating support for said blower element where the same projects through the side of said air heater, said packed floating support including a plate having an opening forming a bearing for said blower element, means yieldably urging said plate against said air heater, and a boss on said plate adapted to surround said blower element, said boss being counterbored to receive packing.

22. In combination, an air heater, a blower element mounted for rotation and reciprocation within said air heater and a bearing for said blower element permitting discharge of cleaning fluid from said blower element through certain predetermined desired arcs.

23. In combination, an air heater, a blower element mounted for reciprocation and rotation within said air heater, and a bearing for supporting one end of said blower element, said bearing including a plate provided with a boss counterbored to receive said blower element, said boss being slotted to permit discharge of cleaning fluid from said element through predetermined desired arcs.

24. The combination with an air heater having a plurality of spaced gas passages, of a blower element for discharging a cleaning fluid into said gas passages, said blower element being provided with a plurality of discharge nozzles, said nozzles being so spaced on the element that a slight longitudinal reciprocation of the element in the direction of the axis thereof will effect a discharge of the cleaning fluid into all of the gas passages.

25. The combination with an air heater having a plurality of aligned sections, of a blower element mounted for reciprocation above all of said sections, and a flexible joint intermediate the ends of said element.

26. The combination with an air heater having a plurality of aligned sections, of a blower element mounted for reciprocation above all of said sections, the said blower element being divided transversely into a plurality of sections, and flexible members connecting the sections of said blower element.

In testimony whereof I affix my signature.
WILLIS P. THOMAS.
In testimony whereof I affix my signature.
NORMAN L. SNOW.